March 27, 1956  O. W. DORFMAN ET AL  2,740,105
SIGNAL LIGHT SYSTEM FOR MOTOR VEHICLES
Filed Sept. 5, 1951  3 Sheets-Sheet 1
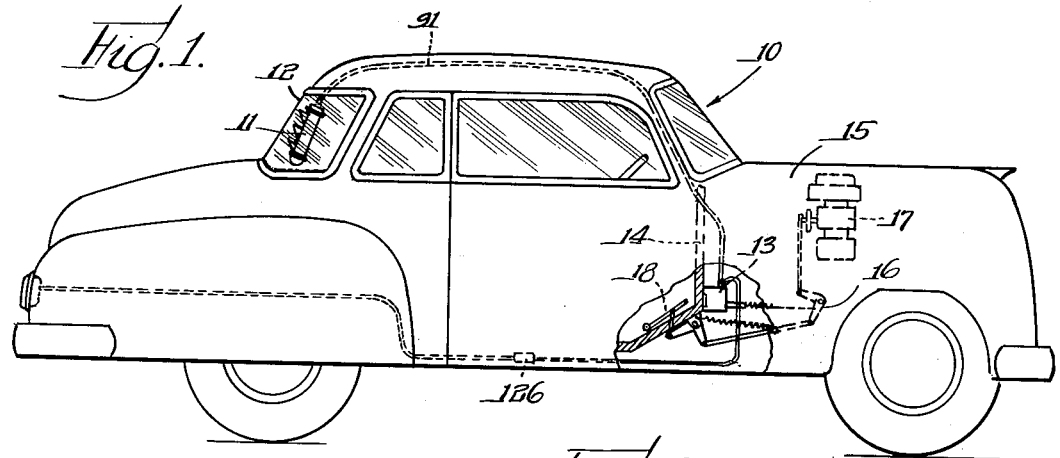
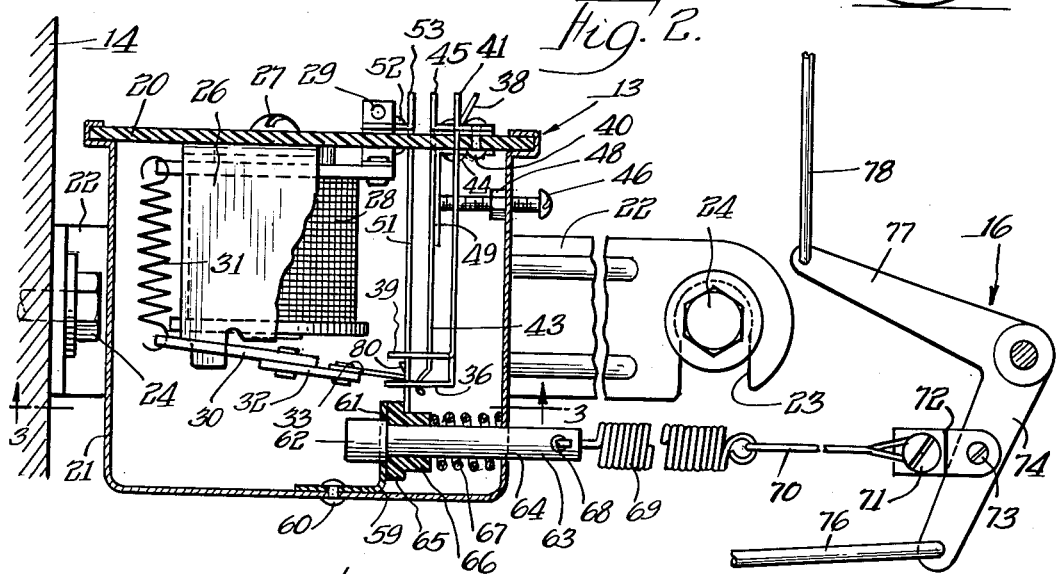
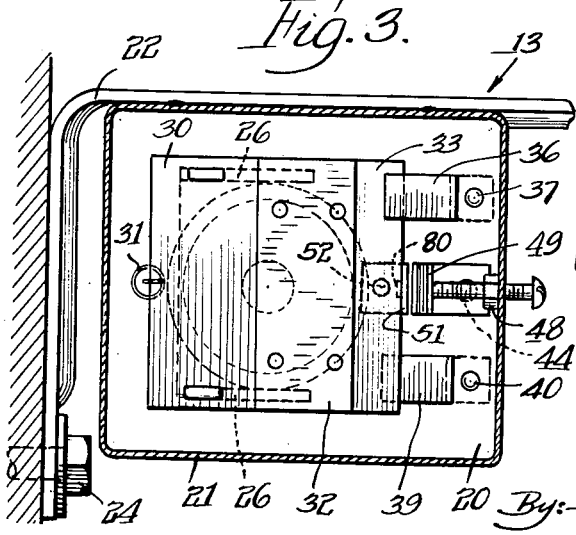
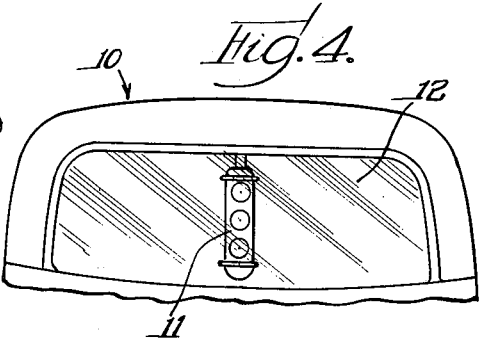
INVENTORS
Oscar W. Dorfman
Ernest Peters
By:- Wallenstein + Spangenberg
Attys.

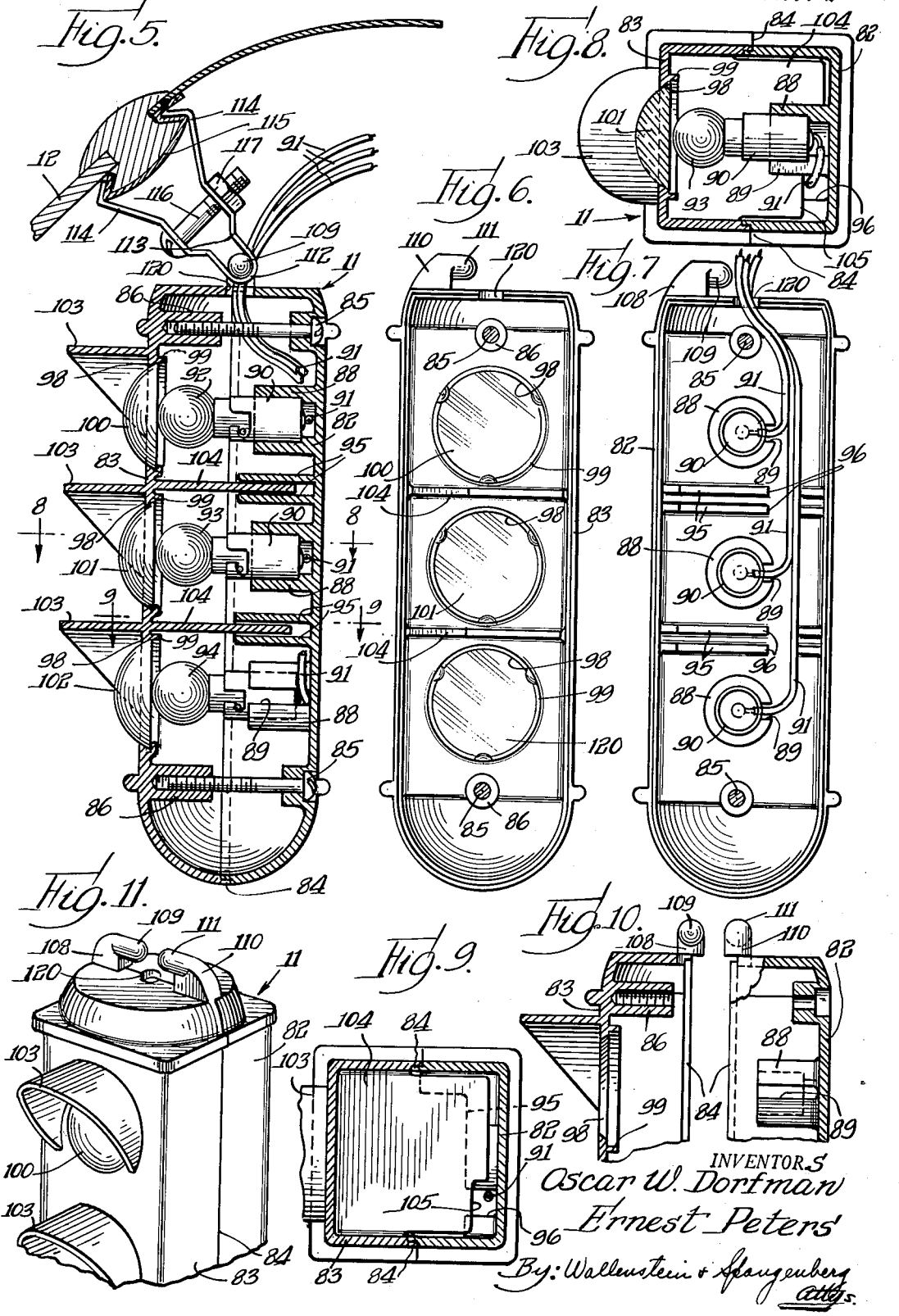

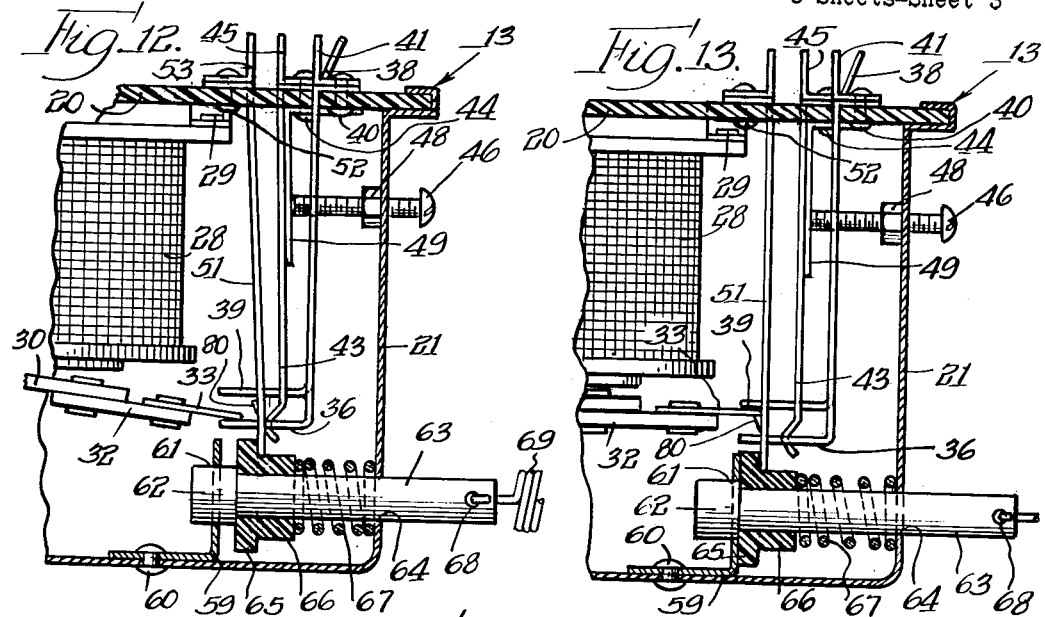

United States Patent Office 2,740,105
Patented Mar. 27, 1956

2,740,105

SIGNAL LIGHT SYSTEM FOR MOTOR VEHICLES

Oscar W. Dorfman and Ernest Peters, Chicago, Ill., assignors to Auto Lamp Manufacturing Company, Chicago, Ill., a copartnership Application September 5, 1951, Serial No. 245,196

9 Claims. (Cl. 340—84)

This invention relates to a signal light system for a motor vehicle such as an automobile or the like for advising operating conditions to following vehicles.

The signal light system of this invention includes red, amber and green signal lights facing the rear of the motor vehicle which are controlled through switching means by the brake and accelerator mechanisms of the motor vehicle, the arrangement being such that when the accelerator is depressed the green signal light is illuminated to signal normal progress or safety, when the accelerator is released the amber signal light is illuminated to signal coasting, slowdown or caution, and when the brakes are applied the red signal light is illuminated to signal stopping or danger. In accordance with one form of this invention the amber light is illuminated when the brakes are released, and in another form, when the brakes are released, the red signal light remains illuminated until the accelerator is depressed to illuminate the green signal light. Either of these latter sequences can be obtained by a minor change in the switching means for the signal lights.

The principal object of this invention is to provide an improved signal light system for a motor vehicle which is simple and rugged in construction and foolproof in operation, which may be inexpensively manufactured, and which may be quickly and inexpensively installed as original equipment or as an accessory to a motor vehicle.

The signal light system includes two main components, a signal light housing having the red, amber and green signal lights and a relay housing having a switching means for controlling the signal lights. In the case of original equipment, the signal light housing may be built into the rear of the automobile or other motor vehicle. In the case of an accessory, the signal light housing may resemble in appearance a traffic light signal and may be suspended within the automobile adjacent the rear window with the signal lights exposed through the rear window. The relay housing may be mounted in any convenient place under the hood of the automobile adjacent the accelerator linkage mechanism. Suitable electrical connections extend between the switching means of the relay housing, the signal lights of the signal light housing and the voltage source of the vehicle. The switching means may be operated by a relay coil electrically connected to the standard stop light switch of the vehicle and also by a cable connection extending to the accelerator linkage mechanism to provide the above described sequences of operation.

The switching means in the relay housing includes first and second contacts spaced from each other and electrically connected respectively to the amber and red signal lights. A third contact carried by the relay armature normally engages the first contact but is moved into engagement with the second contact upon energization of the relay coil when the brakes are applied. A fourth contact is spaced from the end of the movable third contact and is electrically connected to the green signal light. A movable fifth contact electrically connected to the vehicle voltage source normally engages the end of the movable third contact and is moved into engagement with the fourth contact by the cable connection to the accelerator linkage mechanism when the accelerator is depressed. Thus, the green signal light is illuminated when the accelerator is depressed, the amber signal light is illuminated when the accelerator is released, the red signal light is illuminated when the brakes are applied and the amber signal light is illuminated when the brakes are released.

By revising the construction to provide a latch surface on the movable fifth contact which overlies and engages the movable third contact when the latter is moved into engagement with the second contact, the movable third contact is maintained in engagement with the second contact until the movable fifth contact is moved into engagement with the fourth contact. As a result the red signal light remains illuminated after the brakes are released until the accelerator is depressed to illuminate the green signal light.

Further objects of this invention reside in the details of construction of the signal light housing component and the relay housing component and in the cooperative relationships therebetween and between the parts thereof.

Other objects and advantages of this invention will become apparent to those skilled in the art upon reference to the accompanying specification, claims and drawings, in which:

Fig. 1 is a side elevational view of a motor vehicle such as an automobile with the signal light control system of this invention applied thereto;

Fig. 2 is a vertical sectional view through the relay and switching mechanisms with the parts at rest;

Fig. 3 is a horizontal sectional view taken substantially along the line 3—3 of Fig. 2;

Fig. 4 is a view of the rear of the automobile showing the location of the signal light housing;

Fig. 5 is a vertical sectional view through the signal light housing;

Fig. 6 is an inside view of one part of the signal light housing;

Fig. 7 is an inside view of the other part of the signal light housing;

Fig. 8 is a horizontal sectional view taken substantially along the line 8—8 of Fig. 5;

Fig. 9 is a horizontal sectional view taken substantially along the line 9—9 of Fig. 5;

Fig. 10 is a sectional view through the upper part of the signal light housing with the component parts thereof separated;

Fig. 11 is a perspective view of the upper portion of the signal light housing;

Fig. 12 is a partial vertical sectional view similar to Fig. 2 but illustrating the position of the switching means when the motor vehicle accelerator is depressed;

Fig. 13 is a view similar to Fig. 12 but illustrating the position of the switching means when the motor vehicle brakes are applied;

Fig. 14 is a schematic wiring diagram of the signal light system of this invention;

Fig. 15 is an exploded perspective view of the various contacts forming the switching means; and Fig. 16 is a view of a plug adaptor for connecting the relay coil into the standard stop light switch circuit.

Referring first to Figs. 1 to 4, the signal light system of this invention is illustrated as being applied to a motor vehicle such as an automobile, generally designated at 10. The signal light system includes a signal light housing 11 suspended in the automobile adjacent the rear window 12 thereof so that the red, amber and green signal lights of the signal light housing 11 are visible through the rear window. The signal light system also includes a relay and switching mechanism 13 which is mounted under the hood 15 of the automobile as, for example, to the fire wall 14. The automobile includes an accelerator mechanism or linkage 16 for controlling the standard carburetor 17 by manipulation of the standard accelerator 18. The relay and switching mechanism 13 is located adjacent this accelerator linkage mechanism so that it may be readily operated thereby.

The relay and switching mechanism 13 is illustrated in more detail in Figs. 2, 3, 12, 13 and 15 and it includes a base member 20, preferably made of electrical insulating material, and a metallic cover or housing 21 secured to the base member 20. The cover or housing 21 carries a mounting bracket 22 which is suitably secured thereto, as by welding. This bracket 22 is provided on its ends with slots 23 for receiving bolts 24 for mounting the relay and switching mechanism under the hood of the automobile adjacent the accelerator mechanism. This bracket may be bent in any desired shape for mounting the relay and switching mechanism in any desired position on any of the many bolts under the automobile hood. As specifically shown, the relay and switching mechanism 13 is secured to the fire wall 14. While the relay and switching mechanism 13 is shown to be mounted with the base member 20 uppermost, it, of course, may be mounted in any desired position.

The base member 20 carries a relay mechanism having a supporting frame 26 secured by a screw 27 or the like to the base member 20. The relay mechanism includes a relay coil 28 carried by the frame 26, one end of the winding of the coil being connected to an electrical terminal 29 extending through the base member 20 and the other end being connected to the housing 21 and, hence, to ground. The relay frame 26 also pivotally mounts an armature 30 which is urged in one direction by a spring 31. When the relay coil 28 is energized the armature 30 is attracted against the action of the spring 31. The armature 30, by means of an insulating pad 32, carries a contact 33 which is adapted to engage spaced apart first and second contacts 36 and 39, respectively. The contact 36 is secured to the base member 20 and to an electrical terminal 38 by means of a rivet 37. Likewise, the contact 39 is secured by a rivet 40 to the base member 20 and to an electrical terminal 41. When the relay coil 28 is deenergized the contact 33, herein termed the third contact, engages the first contact 36 and when the relay coil 28 is energized this third contact 33 engages the second contact 39.

A fourth contact 43 is spaced from the end of the third contact 33 and is secured by a rivet 44 to the base member 20 and to an electrical terminal 45. A screw 46 screw-threadedly received in a nut 48 suitably secured to the housing 21 engages an insulating strip 49 secured adjacent the fourth contact 43 for adjusting the normal position of the fourth contact 43 with respect to the end of the movable third contact 33. A fifth contact 51 is interposed between the end of the third contact 33 and the fourth contact 43, this contact 51 being secured by a rivet 52 to the base member 20 to an electrical terminal 53. The fifth contact 51 normally engages the end of the third contact 33 but may be moved out of engagement therewith and into engagement with the fourth contact 43.

A bracket 59 is secured to the housing or cover 21 by means of rivets 60 and this bracket 59 is provided with an opening 61 for receiving the head 62 of a pin 63 which is slidably mounted in a hole 64 in the housing member 21. The pin 63 carries a washer 66, formed of insulating material and having a shoulder 65, which overlies the end of the fifth contact 51. A spring 67 is interposed between the housing member 21 and the washer 66 to retract the same for maintaining the movable fifth contact 51 in engagement with the end of the third contact 33. The outer end of the slidable pin 63 is provided with a hole 68 for receiving one end of a tension spring 69. The other end of the tension spring 69 is connected by a cable 70 and screw 71 to a clip 72 which in turn is connected by a screw 73, or the like, to one arm 74 of a bell crank lever forming a part of the accelerator linkage mechanism 16. This bell crank lever 74 is pivoted on a fixed pivot 75. The arm 74 of the bell crank lever is connected through a link 76 to the accelerator 18 and the other arm 77 of the bell crank lever is connected through a link 78 to the carburetor 17 of the automobile. Thus, when the accelerator 18 is released the pin 63 is retracted by the spring 67 to cause the movable fifth contact 51 to engage the end of the third contact 33. When, however, the accelerator 18 is depressed the movable fifth contact 51 is moved out of engagement with the end of the third contact 33 and into engagement with the fourth contact 43, as illustrated in Fig. 12. The spring 67 limits the amount of movement imparted to the movable fifth contact 51 and the spring 69 operates as a strain release connection to permit further, or excess, movement of the accelerator linkage mechanism 16.

When the brakes of the automobile are applied the relay coil 28 is energized to attract the armature 30 and, hence, move the third contact 33 from engagement with the first contact 36 into engagement with the second contact 39 and, during this movement, the end of the third contact 33 is engaging the fifth contact 51. The positions of the contacts upon application of the brakes is illustrated in Fig. 13. The fifth contact 51 is preferably provided with a latch surface 80 which overlies the end of the movable third contact 33 when it is moved into engagement with the second contact 39. This latch surface 80, therefore, latches the movable third contact 33 into engagement with the second contact 39 and maintains this engagement even though the relay coil 28 is subsequently deenergized. This engagement is maintained until such time as the movable fifth contact 51 is moved into engagement with the fourth contact 43, as illustrated in Fig. 12, whereupon the third contact 33 moves out of engagement with the second contact 39 into engagement with the first contact 36. If the latch surface 80 is eliminated, then the movable third contact 33 is not latched into engagement with the second contact 39 so that immediately upon deenergization of the relay coil 28 the movable third contact 33 moves into engagement with the first contact 36.

The signal light housing 11 and the manner of suspending the same in the rear window 12 of the automobile is illustrated in more detail in Figs. 5 to 11. Here the signal light housing 11 includes two parts 82 and 83, which are secured together in a vertical overlap joint 84. These parts may be made in any suitable fashion and, as here illustrated, they are formed by die casting. The two parts 82 and 83 are secured together by a pair of screws 85 extending through holes in the part 82 into screw-threaded bosses 86 in the part 83.

The part 82 is provided with three vertically aligned socket members 88, having side openings 89. Secured in each of these sockets members 88, as by a force fit, is a lamp socket 90, the lamp socket 90 being grounded to the socket member 88 and the wire 91 of the lamp socket 90 extending through the side opening 89 in the socket member 88. The lamp sockets 90 receive signal lights 92, 93 and 94, respectively, by the usual bayonet-type connection. The part 82 is also provided with two pairs of partition members 95 having recesses 96 for accommodating the wires 91.

The other part 83 is provided with three openings 98 in alignment with the socket members 88 of the first part of the signal light housing. Arranged about the openings 98 is a flange 99. The openings 98 receive red, amber and green lenses 100, 101 and 102, respectively, these lenses being secured in the openings 98 by peening over portions of the internal flanges 99. The outer surface of the part 83 is provided with outwardly extending visors 103 overlying the lenses 100, 101 and 102 for the purpose of eliminating glare which might be caused by sunlight. The inner surface of the part 83 is provided with partitions 104 which extend between the partitions 95 of the other part 82, the partitions 104 also being provided with recesses 105 for accommodating the wires 91. These partitions 95 and 104 operate to confine the light of any lamp 92, 93 or 94 to their respective lenses 100, 101 and 102.

One side of the upper end of the housing part 82 is provided with an extension 108 having an inwardly facing lug 109 and, likewise, one side of the upper end of the other housing part 83 is provided with an extension 110 having an inwardly facing lug 111. The inwardly facing lugs 109 and 111 are in alignment, overlie the joint between the two housing parts and form a horizontally arranged mounting bar for the signal light housing 11. This mounting bar receives the closed end 112 of a U-shaped clamp 113. The extremities or fingers 114 of the clamp 113 are adapted to engage the window frame 115 of the rear window 12 of the automobile. A screw 116 extending through holes in the U-shaped clamp cooperates with a nut 117 for drawing the clamp together to secure the clamp to the rear window frame and adjustably to carry the signal light housing 11. In this way the signal light housing is suspended in the automobile adjacent the rear window with the signal lights exposed to view through the rear window. Because of the adjustable mounting the signal light housing 11 may be tipped forwardly or backwardly with respect to the rear window as desired. The wires 91 extending from the signal lights extend upwardly through the signal light housing 11 and pass through a central opening 120 in the top of the housing. These wires are then extended to the relay and switching mechanism 13 as, for example, along the top of the automobile, as is illustrated in Fig. 1.

Fig. 14 illustrates the wiring utilized in the signal light system and, also, the manner in which the signal light system is associated with the standard stop light circuit. Here the red, amber and green signal lights 92, 93 and 94 and the signal light housing 11 are connected to ground, as illustrated at 122. One end of the relay coil 28 is also connected to ground, as illustrated at 123. The motor vehicle voltage source is illustrated as a battery 124, one terminal of which is connected to ground at 125. The other terminal of the battery 124 is connected through the standard stop light switch 126 and the standard stop light 128 to ground 129 so that when the standard stop light switch 126 is closed a circuit is completed through the standard stop light 128. The other end of the relay coil 28 is connected by a conductor 130 and an electrical connector 127 to the standard stop light circuit so that when the standard stop light switch 126 is closed, the relay coil 28 is energized. The positive terminal of the battery 124 is also connected through the ignition switch 131 to the fifth contact 51, which in turn engages either the end of the movable third contact 33 or the fourth contact 43. The fourth contact 43 is connected to the green signal light 94. The third contact 33, which is normally engaged by the fifth contact 51, normally engages the first contact 36 which in turn is connected to the amber signal light 93. The second contact 39, which is engaged by the third contact 33 when the relay is energized, is connected to the red signal light 92.

When the accelerator is depressed a circuit is completed from the battery 124 through the ignition switch 131, the fifth contact 51, the four contact 43 and the green signal light 94 to ground for illuminating the green signal light to signal normal progress or safety. When the accelerator is released a circuit is completed from the battery 124 through the ignition switch 131, the fifth contact 51, the third contact 33, the first contact 36 and the amber signal light 93 to ground to illuminate the amber signal light for signalling coasting, slowdown or caution. When the motor vehicle brakes are applied the relay coil 28 is energized through the standard stop light switch 126 to move the third contact 33 into engagement with the second contact 39 to complete a circuit from the battery 124 through the ignition switch 131, the fifth contact 51, the third contact 33, the second contact 39 and the red signal light 92 to ground for illuminating the red signal light to signal stopping or danger. When this occurs the third contact 33 is latched into engagement with the second contact 39 by the latch surface 80 to maintain the red signal light 92 illuminated even though the brakes are released and the relay coil 28 is deenergized. The red signal light 92, therefore, remains illuminated until such time as the fifth contact 51 is moved by depressing the accelerator into engagement with the fourth contact 43 for illuminating the green signal light 94. If the latch surface 80 is omitted, then the movable third contact 33 immediately moves into engagement with the first contact 36 upon release of the brakes for illuminating the amber signal light 93.

To facilitate connection of the relay coil 28 into the standard stop light circuit, a quick disconnect fitting 127, illustrated in Fig. 16, is utilized. This fitting 127 has the wire 130 extending to the relay coil 28 secured thereto and is provided with a plug projection 133 and a socket 134. The plug 133 receives a socket extending from the standard stop light switch 126 and the socket 134 receives a plug extending from the standard stop light 128.

While for purposes of illustration one form of this invention has been disclosed, other forms thereof may become apparent to those skilled in the art upon reference to this disclosure and, therefore, this invention is to be limited only by the scope of the appended claims.

We claim as our invention:

1. In a signal light system for a motor vehicle, a signal light housing including front and back parts, a joint between the front and back parts and means for securing the front and back parts together, said back part internally including three aligned and forwardly facing socket members, a lamp socket secured in each socket member for receiving signal lamps, said front part having three openings in alignment with the three socket members of the back part, red, amber and green lenses secured in said three openings for signalling red, amber and green when the respective lamps are illuminated, and internal partitions carried by at least one of the housing parts and extending across the housing between the socket members.

2. In a signal light system for an automobile having a rear window, a signal light housing including front and back parts, a joint between the front and back parts and means for securing the front and back parts together, said back part internally including three aligned and forwardly facing socket members, a lamp socket secured in each socket member for receiving signal lamps, said front part having three openings in alignment with the three socket members of the back part, red, amber and green lenses secured in said three openings for signalling red, amber and green when the respective lamps are illuminated, internal partitions carried by at least one of the housing parts and extending across the housing between the socket members, an inwardly facing lug on the tip of each front and back housing part overlying the joint therebetween and forming a horizontally arranged mounting bar, a U-shaped clamping member having its closed portion encompassing the mounting bar and its open portions adapted to clamp the inner frame of the rear window of the automobile, and means for drawing together the clamping member for suspending the signal light housing in the automobile adjacent the rear window with the red, amber and green lenses facing outwardly through the rear window and for adjustably positioning the signal light housing with respect to the rear window.

3. In a signal light system for an automobile having a rear window, a signal light housing adapted to be mounted in the automobile adjacent the rear window thereof and including separable front and back parts, a joint between the front and back housing parts, means for releasably securing together the front and back housing parts at their joint to form an enclosure in the housing, three lamp sockets, means on the back housing part for supporting the three lamp sockets in forwardly facing parallel alignment in the enclosure of the housing, a signal lamp removably carried by each lamp socket, said front housing part having three openings in alignment with the three lamp sockets supported by the back housing part, red, amber and green lenses in said three openings in the front housing part adjacent the signal lamps carried by the lamp sockets for signalling red, amber and green when the respective signal lamps are illuminated, and internal partitions on at least one of the housing parts and extending across the housing between the lamp sockets to form a separate subenclosure for each lamp socket to confine the illumination of the signal lamps to their respective lenses.

4. In a signal light system for an automobile having a rear window, a signal light housing adapted to be mounted in the automobile adjacent the rear window thereof and including separable front and back parts, a joint between the front and back housing parts, screws extending through the back housing part into the front housing for releasably securing together the front and back housing parts at their joint to form an enclosure in the housing, three lamp sockets, means on the back housing part for supporting the three lamp sockets in forwardly facing parallel alignment in the enclosure of the housing, a signal lamp removably carried by each lamp socket, said front housing part having three openings in alignment with the three lamp sockets supported by the back housing part, red, amber and green lenses in said three openings in the front housing part adjacent the signal lamps carried by the lamp sockets for signalling red, amber and green when the respective signal lamps are illuminated, and a pair of internal partitions on the front housing part and extending across the housing between the lamp sockets to form a separate subenclosure for each lamp socket to confine the illumination of the signal lamps to their respective lenses.

5. In a signal light system for an automobile having a rear window and window frame therefor, a signal light housing adapted to be mounted in the automobile adjacent the rear window thereof for signalling therethrough and including separable front and back parts, a joint between the front and back housing parts, means for releasably securing together the front and back housing parts at their joint to form an enclosure in the housing, three lamp sockets, means on the back housing part for supporting the three lamp sockets in forwardly facing parallel alignment in the enclosure of the housing, a signal lamp removably carried by each lamp socket, said front housing part having three openings in alignment with the three lamp sockets supported by the back housing part, red, amber and green lenses in said three openings in the front housing part adjacent the signal lamps carried by the lamp sockets for signalling red, amber and green when the respective signal lamps are illuminated, and internal partitions on at least one of the housing parts and extending across the housing between the lamp sockets to form a separate subenclosure for each lamp socket to confine the illumination of the signal lamps to their respective lenses, and a clamp carried by the housing for clamping the housing to the frame of the rear window of the automobile for suspending the same in the automobile adjacent the rear window with the red, amber and green lenses exposed outwardly through the rear window.

6. In a signal light system for an automobile having a rear window and window frame therefor, a signal light housing adapted to be mounted in the automobile adjacent the rear window thereof for signalling therethrough and including separable front and back parts, a joint between the front and back housing parts, means for releasably securing together the front and back housing parts at their joint to form an enclosure in the housing, three lamp sockets, means on the back housing part for supporting the three lamp sockets in forwardly facing parallel alignment in the enclosure of the housing, a signal lamp removably carried by each lamp socket, said front housing part having three openings in alignment with the three lamp sockets supported by the back housing part, red, amber and green lenses in said three openings in the front housing part adjacent the signal lamps carried by the lamp sockets for signalling red, amber and green when the respective signal lamps are illuminated, and internal partitions on at least one of the housing parts and extending across the housing between the lamp sockets to form a separate subenclosure for each lamp socket to confine the illumination of the signal lamps to their respective lenses, and a clamp carried by the housing for clamping the housing to the frame of the rear window of the automobile for suspending the same in the automobile adjacent the rear window with the red, amber and green lenses exposed outwardly through the rear window, said clamp including a pair of spaced members having facing flanges for engaging over the rear window frame and a screw and nut for drawing the members together for clamping purposes.

7. In a signal light system for use in an automobile having a rear window, a signal light housing adapted to be mounted in the automobile adjacent the rear window thereof and including separable front and back parts, means for releasably securing together the front and back housing parts to form an enclosure in the housing, internal partition means in one of the housing parts dividing the housing enclosure into a plurality of separate subenclosures, a plurality of lamp sockets carried by one of the housing parts with a lamp socket located in each of said separate subenclosures, a signal lamp removably carried by each lamp socket in each subenclosure, the front housing part having an opening therethrough interiorly communicating with each subenclosure, and a lens secured in each opening in the front housing part adjacent the signal lamp of its associated subenclosure, each of said lenses being of a different color for providing different color signals as the associated signal lamps are illuminated and the partition means confining the illumination of the signal lamps to their respective lenses.

8. In a signal light system for use in an automobile having a rear window, a signal light housing adapted to be mounted in the automobile adjacent the rear window thereof and including separable front and back parts, means for releasably securing together the front and back housing parts to form an enclosure in the housing, internal partition means in one of the housing parts dividing the housing enclosure into a plurality of separate subenclosures, a plurality of lamp sockets carried by one of the housing parts with a lamp socket located in each of said separate subenclosures, a signal lamp removably carried by each lamp socket in each subenclosure, the front housing part having an opening therethrough interiorly communicating with each subenclosure, an internal flange in the front housing part about each opening, and a lens in each opening in the front housing part adjacent the signal lamp of its associated subenclosure, portions of the internal flanges being peened over for securing the lenses in the openings, each of said lenses being a different color for providing different color signals as the associated signal lamps are illuminated and the partition means confining the illumination of the signal lamps to their respective lenses.

9. In a signal light system for use in an automobile having a rear window provided with an inner frame, a signal light housing adapted to be mounted in the automobile adjacent the rear window thereof and including separable front and back parts, means for releasably securing together the front and back housing parts to form an enclosure in the housing, internal partition means in one of the housing parts dividing the housing enclosure into a plurality of separate subenclosures, a plurality of lamp sockets carried by one of the housing parts with a lamp socket located in each of said separate subenclosures, a signal lamp removably carried by each lamp socket in each subenclosure, the front housing part having an opening therethrough interiorly communicating with each subenclosure, and a lens secured in each opening in the front housing part adjacent the signal lamp of its associated subenclosure, each of said lenses being of a different color for providing different color signals as the associated signal lamps are illuminated and the partition means confining the illumination of the signal lamps to their respective lenses, and a clamp carried by the housing for clamping the housing to the inner frame of the rear window of the automobile for suspending the housing in the automobile adjacent the rear window with the multicolored lenses exposed outwardly through the rear window.

References Cited in the file of this patent

UNITED STATES PATENTS

| | | | |
|---|---|---|---|
| 624,845 | Mosher | May 9, | 1899 |
| 1,302,001 | Bogert | Apr. 29, | 1919 |
| 1,370,674 | Smith | Mar. 8, | 1921 |
| 1,465,213 | Feinberg | Aug. 14, | 1923 |
| 1,529,231 | Arnold | Mar. 10, | 1925 |
| 1,711,477 | Halvorson, Jr. | Apr. 30, | 1929 |
| 1,798,966 | Bully et al. | Mar. 31, | 1931 |
| 1,806,126 | Springfels | May 19, | 1931 |
| 1,999,885 | Tarlton | Apr. 30, | 1935 |
| 2,084,252 | Hallenberg | June 15, | 1937 |
| 2,096,069 | Seiden | Oct. 19, | 1937 |
| 2,272,212 | Larson | Feb. 10, | 1952 |
| 2,513,712 | Coombs | July 4, | 1950 |